(12) United States Patent
Menzl et al.

(10) Patent No.: US 8,683,364 B2
(45) Date of Patent: Mar. 25, 2014

(54) GRAPHICAL INTERCONNECTION OF HARDWARE SIGNALS

(75) Inventors: Franz-Josef Menzl, Greding (DE); Ralf Mildenberger, Schutterwald (DE); Pablo Munoz Ibarra, Erlangen (DE); Axel Platz, München (DE); Johanna Schmidt, Burghausen (DE); Wilhelm Wehrfritz, Neunkirchen am Brand (DE); Markus Weinlander, Happurg (DE)

(73) Assignee: Siemens Aktiengesellschaft, Munich (DE)

( * ) Notice: Subject to any disclaimer, the term of this patent is extended or adjusted under 35 U.S.C. 154(b) by 1648 days.

(21) Appl. No.: 11/502,488

(22) Filed: Aug. 10, 2006

(65) Prior Publication Data

US 2007/0067053 A1    Mar. 22, 2007

(30) Foreign Application Priority Data

Aug. 12, 2005   (EP) ..................................... 05017627

(51) Int. Cl.
*G06F 3/048* (2013.01)

(52) U.S. Cl.
USPC ........................................................ 715/771

(58) Field of Classification Search
USPC .............................. 715/734–736, 771; 716/16
See application file for complete search history.

(56) References Cited

U.S. PATENT DOCUMENTS

| | | | |
|---|---|---|---|
| 6,272,669 B1* | 8/2001 | Anderson et al. | 716/16 |
| 6,754,885 B1* | 6/2004 | Dardinski et al. | 717/113 |
| 2003/0058280 A1* | 3/2003 | Molinari et al. | 345/771 |

FOREIGN PATENT DOCUMENTS

EP    0 876 647 B1    11/1998

OTHER PUBLICATIONS

D. Anderson, C. Marcjan, D. Bersch, H. Anderson, P. Hu, O. Palusinski, D. Gettman, I. MacBeth, A. Bratt; "A Field Programmable Analog Array and its Application"; IEEE 1997 Custom Integrated Circuits Conference; May 5-8, 1997; pp. 555-558; XP-010125366.

* cited by examiner

*Primary Examiner* — Enrique Iturralde

(57) ABSTRACT

A system and a method for graphical interconnection of hardware signals of a device, (e.g., a controller device) are provided. The graphical interconnection can now be implemented in a simple manner so that a user can perform this function intuitively and without knowledge of the address convention used in the engineering system. This may be achieved by the inventive system and by the inventive method by the hardware signals being interconnected graphically with program elements of a programming environment using drag & drop features in a graphical user interface.

8 Claims, 3 Drawing Sheets

GRAPHICAL INTERCONNECTION OF HARDWARE SIGNALS

CROSS REFERENCE TO RELATED APPLICATIONS

This application claims priority of European application No. 05017627.0 EP filed Aug. 12, 2005, which is incorporated by reference herein in its entirety.

FIELD OF INVENTION

The invention relates to a system and a method for graphical interconnection of hardware signals of a device, especially of a controller device.

BACKGROUND OF INVENTION

This type of system is employed in particular in the area of industrial automation. A major task in the creation of an automation solution is the programming. This involves hardware signals of a controller system—that is input and output values of a controller device—technically being connected to a terminal and then logically linked in a meaningful manner in an engineering system to program elements, especially for programmable logic controllers (PLCs). To enable the desired hardware signal to be referenced it is necessary to enter an address which will be logically assigned to a hardware signal. These addresses are formed according to conventions which the user must know and which differ from system to system. With an incorrectly used address—with syntactical errors—the engineering system can indicate an error; with other input errors the result is malfunctions of the controller system.

For example the address convention for SIMATIC S7 is as follows: First a letter (E for input signals, A for output signals), followed by the byte address, a point and a bit number. The byte addresses begin at 0 and are increased for each module by 4, i.e. 0, 4, 8. The bit addresses are 0 ... 7. A valid address is thus for example "E4.7".

In addition it is possible in many systems to allocate a symbol to each of the individual addresses. The user can thus assign the individual hardware signals "meaningful" names, i.e. can give them names which convey a certain meaning to the user. The problem with this solution is that a user who does not know the convention is hardly in a position to plan an automation system project without assistance. This applies especially to those users migrating from one system to another, since each manufacturer as a rule has their own convention. Furthermore those making the change find it difficult to understand how the different mappings (symbol→address→hardware signal) function. This is a significant barrier to getting started with a system.

SUMMARY OF INVENTION

An object of the invention is to create a system of the type mentioned at the start with which the hardware signals of a device, especially of a controller device, can be logically linked in a simple manner graphically to program elements of a program environment. An object of the invention is also to develop a method with which a user can logically link hardware signals of a device, especially of a controller device, graphically to program elements in a simple manner, i.e. without having to know the address convention used in the system.

This object is achieved by a system for graphical interconnection of hardware signals of a device, especially of a controller device, consisting of
- a processor unit for connection to the device, with means for helping the user to make entries, especially a keyboard and mouse,
- a display device with a graphical user interface,
- means for schematic presentation of the device in a first subarea of the graphical user interface, with terminals present on the device being able to be at least schematically visualized in accordance with their position on the device, and able to be provided with a logical address in accordance with the convention used in the system and
- means for logically linking the hardware signals with program elements of a programming environment which can be presented in a second subarea of the graphical user interface, with the terminals visualized in the first subarea of the graphical user interface being able to be selected and dragged using drag & drop onto at least one program element at which the address of the corresponding terminal can be displayed, This object is further achieved by a method for graphical interconnection of hardware signals of a device, especially of a controller device, based on
- a processor unit for connection to the device, with means for helping the user to make entries, especially a keyboard and mouse,
- a display device with a graphical user interface,
- means for schematic presentation of the device in a first subarea of the graphical user interface, with terminals present on the device being able to be at least schematically visualized in accordance with their position on the device, and able to be provided with a logical address in accordance with the convention used in the system and
- means for logically linking the hardware signals with program elements of a programming environment which can be presented in a second subarea of the graphical user interface, with the terminals visualized in the first subarea of the graphical user interface being able to be selected and dragged using drag & drop in each case onto at least one program element at which the address of the corresponding terminal can be displayed.

The inventive division of the graphical user interface into at least two subareas, of which, in a first subarea the terminals present on the device are correspondingly able to be visualized at least schematically in accordance with their location on the device and of which, in a second subarea the programming elements of the programming environment can be presented, enable a user in the schematic presentation—the map of his real device, especially controller device, in which he locates the terminals as they are on the device—to select a terminal in the first subarea of the graphical user interface and use drag & drop to drag it onto the corresponding program element of the program environment in the second subarea of the graphical user interface, without him having to know the convention used in the system. The fact that the logical address corresponding to convention used in the system can be shown both at the terminal in the schematic presentation itself and also on the program element onto which the corresponding terminal was dragged, also enables the user to learn the addressing scheme used in the engineering system step-by-step. This means that the inventive system together with the inventive method makes a significant contribution to the ease of learning of an engineering system and helps beginners and those migrating from other manufacturers to find a simple point of entry into the programming of such engineering systems. This results in shorter familiarization times and a competitive advantage for the manufacturer.

In an advantageous form of the embodiment the schematic presentation of the device can be generated by the system by means of a plug-and-play function, by means of which all the information necessary for presentation is read out from the connected device. For this function the user must first set up the device and connect it to the processor unit, something which he must do in any event to operate or to test the device. There is no restriction of the system or the application of the method to specific devices, for example those stored in the processor unit; the use of the plug-and-play function allows the connection and operation of any devices, as well as of course the presentation and graphical interconnection of the associated terminals, or of the hardware signals assigned to them respectively.

In a further advantageous embodiment a symbolic name can be allocated in each case to the terminals in the schematic presentation of the device, and this name can be displayed together with the logical address of the relevant terminal in the programming environment. The name is edited directly at the terminal by clicking on the representation of a hardware signal in the schematic presentation. The simultaneous presentation of the symbolic name and the logical address is an additional simplification for the user in learning the address convention used in the engineering system.

In a further advantageous embodiment a visual marking can be applied to the terminals in the schematic presentation for using the corresponding terminal in the programming environment. The user is shown by this that the hardware signal assigned to the corresponding terminal was already interconnected, which avoids any accidental double interconnection of hardware signals.

BRIEF DESCRIPTION OF THE DRAWINGS

The invention is described and explained in more detail below on the basis of the exemplary embodiments shown in the Figures. The figures show.

DETAILED DESCRIPTION OF INVENTION

Figure 1:
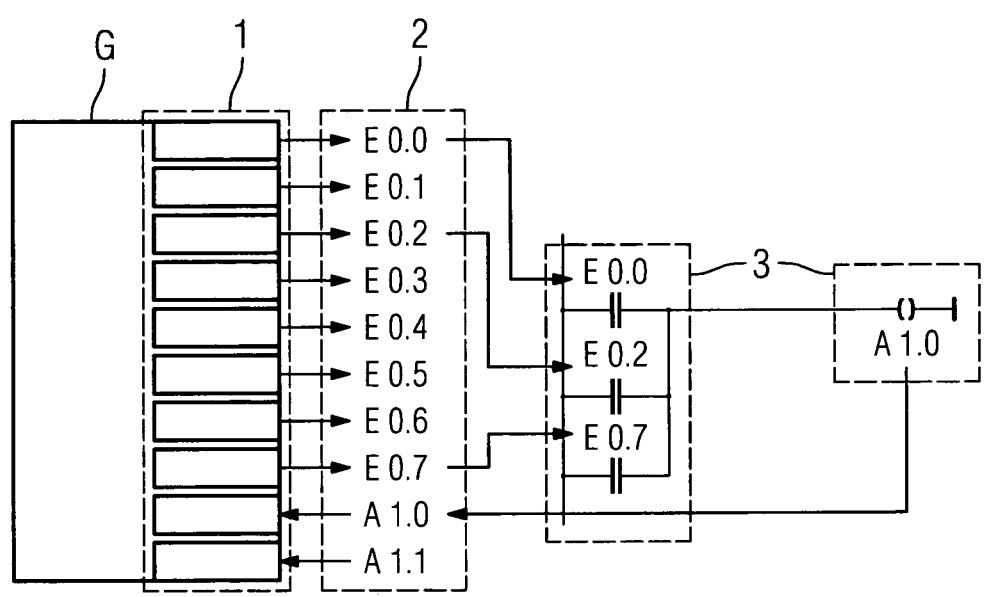
FIG. 1 a basic diagram for assignment of hardware signals to program elements via logical addresses, FIG. 2 a graphical user interface for graphical interconnection of hardware signals, FIG. 3 the graphical user interface from FIG. 2, with a symbolic name for a terminal in the first subarea of the graphical user interface FIG. 4 the graphical user interface from FIG. 4, with a hardware signal which can be moved using drag & drop from the first subarea of the graphical user interface onto a program element in the second subarea, FIG. 5 the graphical user interface from FIG. 4 with the hardware signal interconnected in the second subarea with the program element.

FIG. 1 shows the assignment of hardware signals of a device (G) to program elements 3 via logical addresses 2 according to the address convention of a PLC (Programmable Logic Controller). Each terminal 1 assigned to a hardware signal is assigned a logical address 2. These in their turn are assigned to program elements 3 for interconnection of the hardware signals.

Figure 2:
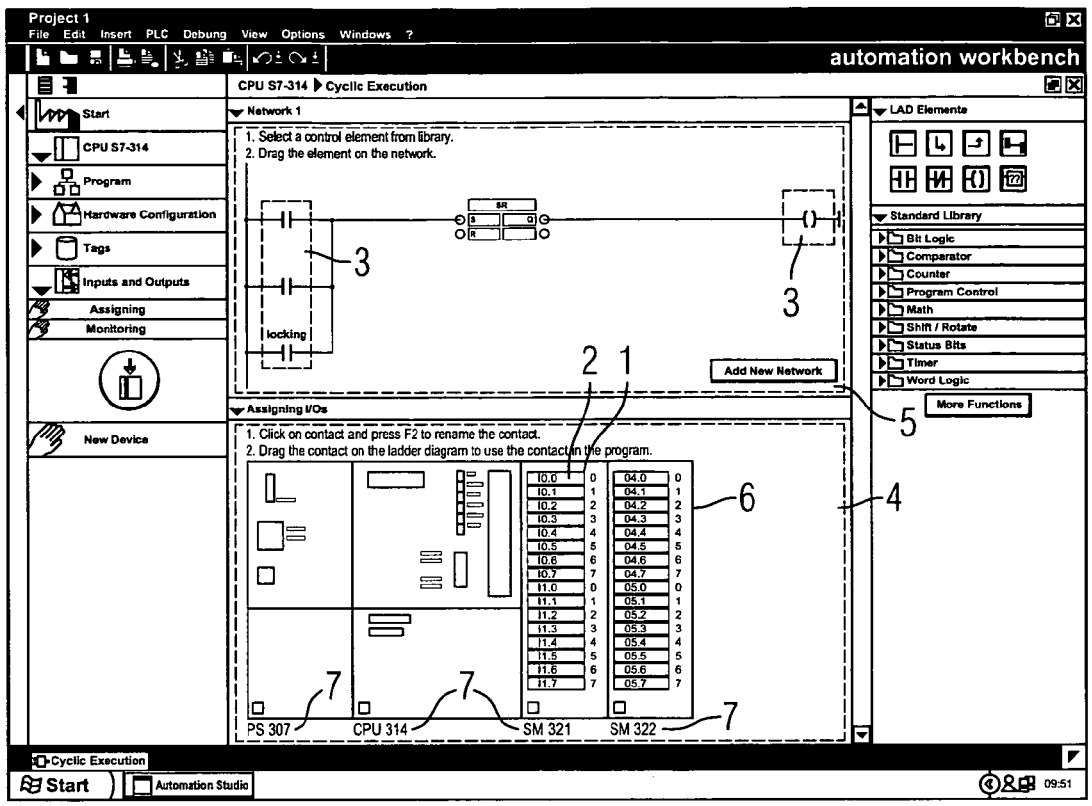

FIG. 2 shows a graphical user interface in accordance with the invention with a first subarea of the graphical user interface in which terminals 1 present on the device can be visualized in an at least schematic presentation 6, and a second subarea of the graphical user interface in which program elements 3 of a program environment, shown here by a contact plan, can be presented. All modules 7 and terminals 1 of the device are shown in the schematic presentation 6, and are shown in such a way that the user can recognize the real position of the terminals 1 again. This map 6 of the device is created by the system. To do this the user must first set up the device and connect it to the processor unit. Using a plug-and-play function the system reads out all the information required for presentation 6 from the connected device. Standard functions of an engineering system, such as menu control and selection of program elements can be called for example in further subareas of the graphical user interface.

Figure 3:
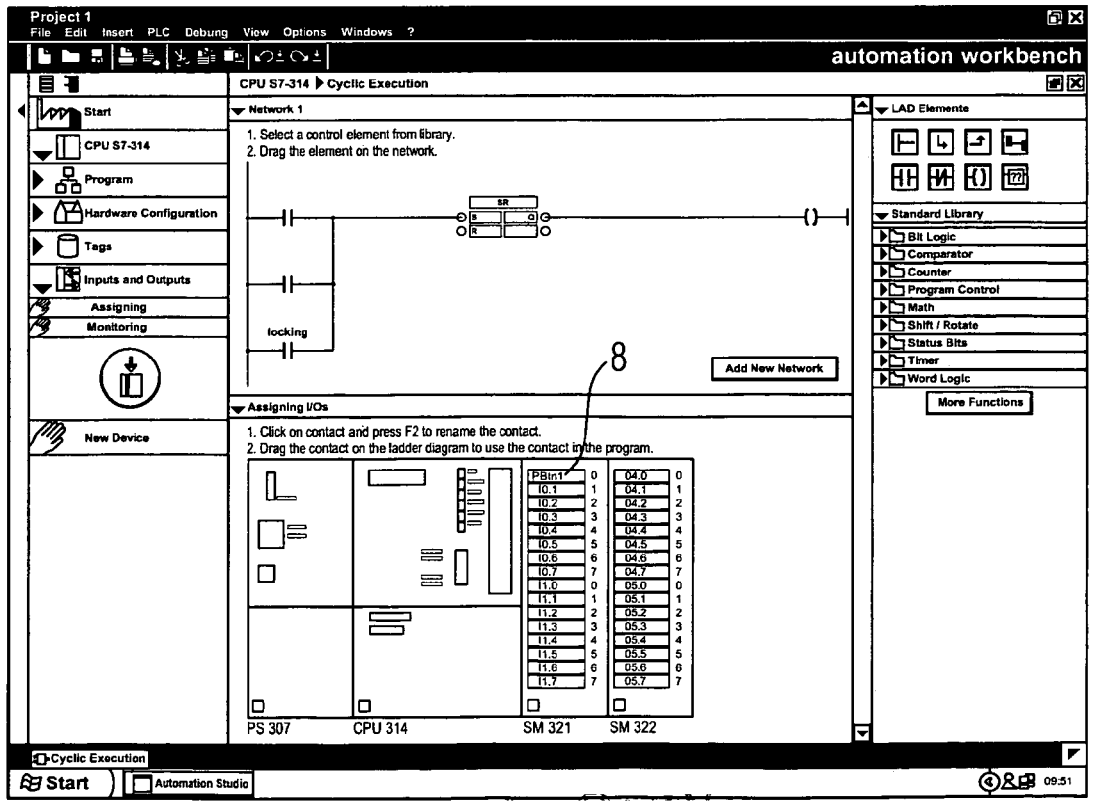

FIG. 3 shows the editing of a symbolic name 8 in the first subarea of the inventive graphical user interface 4. The user can click with an input means, especially with a mouse, on the representation of a hardware signal, a terminal 1, and give this hardware signal a symbolic name 8. The name 8 is edited directly at the terminal 1.

Figure 4:
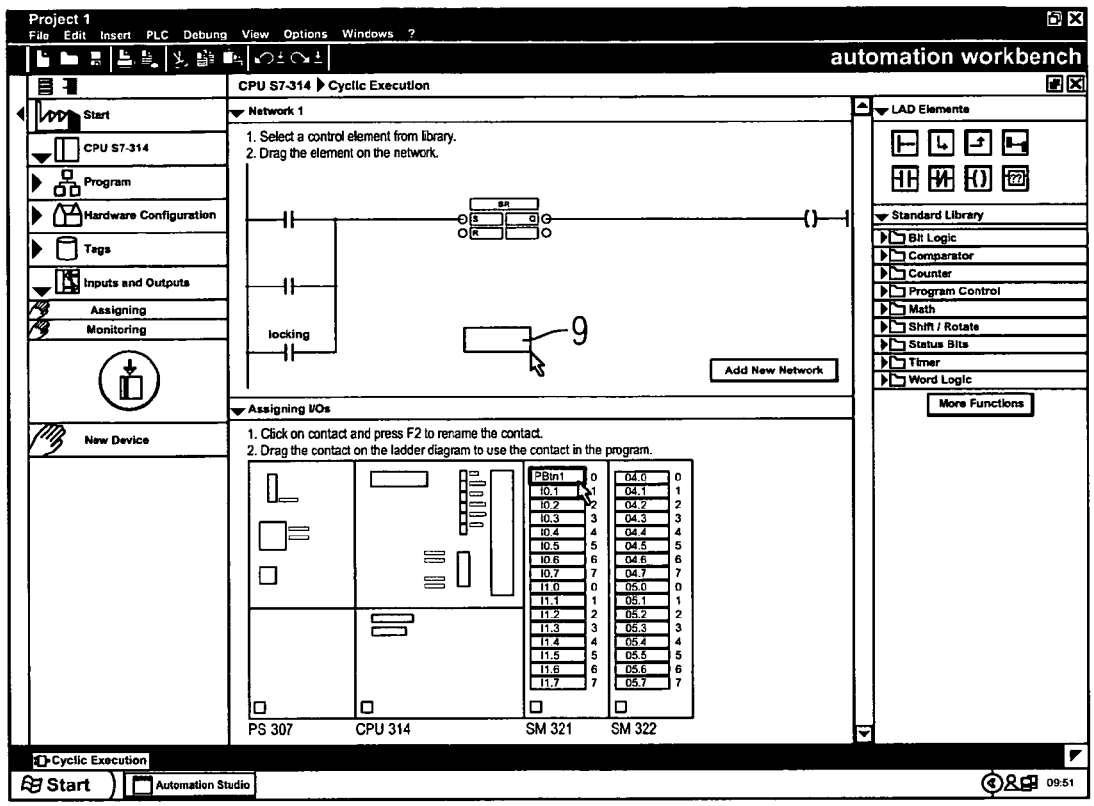

FIG. 4 shows the interconnection of a hardware signal with a program element 3 using drag & drop. The user selects the terminal 1 of the desired hardware signal in the first subarea of the graphical user interface 4 and drags it onto the corresponding program element 3 in the contact plan in the second subarea of the graphical user interface. During this step in the procedure the relevant position of the terminal 1 can be indicated by a pointer with rectangle 9.

Figure 5:
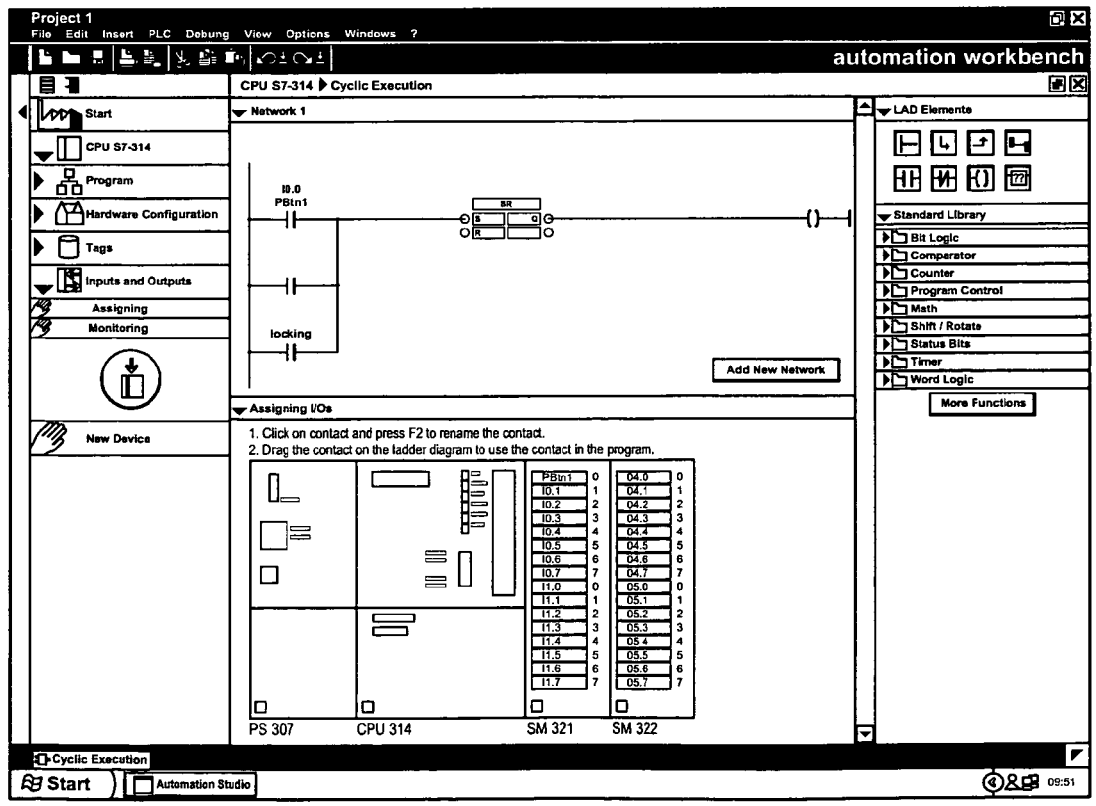

FIG. 5 shows a view of the completed program element interconnection 3 in the second subarea of the graphical user interface 5. The logical address 2 and the symbolic name 8 are shown on the program element 3 so that the user can also learn the address convention used in the engineering system step-by-step.

In summary the invention relates to a system and a method for graphical interconnection of hardware signals of a device, especially of a controller device. The object of the invention is to design the graphical interconnection in a simple manner so that a user can perform this function intuitively and without knowledge of the address convention used in the engineering system. This object is achieved by the inventive system and by the inventive method in that the hardware signals are interconnected graphically with program elements of a programming environment using drag & drop.

The invention claimed is:

1. A system for graphical interconnection of a hardware signal of a controller device having a plurality of terminals, comprising:
   a processor unit for connection to the device, the processing unit having a keyboard and a mouse;
   a display device with a graphical user interface having a first area and a second area;
   a schematic presentation of the device in the first area, each device terminal displayed in accordance with a respective position on the device and provided with a logical address corresponding to an address convention used by the system to assign a hardware signal to the logical address; and
   a linking mechanism for logically linking the hardware signal assigned to the logical address with a program element of a programming environment presented in the second area,
   wherein a logical address of a terminal representation displayed in the first area corresponding to a hardware signal to be interconnected is selected, dragged, and dropped onto the program element, and
   wherein the dropped address is displayed with the program element in the second area, wherein a user-editable symbolic representation of the logical address is displayed together with the logical address, wherein the user-editable symbolic representation of the logical address is edited by clicking on the displayed terminal representation corresponding to the hardware signal to be interconnected, wherein the dropping of the representation of the selected terminal onto the program element causes the hardware signal to be logically linked via the logical address with the program element without a user having to know the address convention used by the system.

2. The system as claimed in claim 1, wherein when a terminal from the plurality of terminals is used in the programming environment a marking is applied in the schematic presentation.

3. The system as claimed in claim 1, wherein the schematic presentation is generated by the system via a plug-and-play function such that the information for presentation is read from the connected device.

4. The system as claimed in claim 1, wherein when a terminal from the plurality of terminals is used in the programming environment a marking is applied in the schematic presentation.

5. A method for graphical interconnection of a hardware signal of a device having a plurality of terminals, comprising:
providing a processor unit for connection to the device;
providing a display unit with a graphical user interface having a first and second areas;
displaying a schematic presentation of the device in the first area, each device terminal displayed in accordance with a position of the respective terminal on the device, each displayed device terminal including a logical address corresponding to an address convention used by the device to assign a hardware signal to the logical address;
displaying a program element of a programming environment in the second area;
selecting from the schematic presentation displayed on the first area a terminal representation with a respective logical address, the selected terminal representation corresponding to a hardware signal to be interconnected;
dragging the representation of the selected terminal from the first area to the second area;
dropping the representation of the selected terminal on the program element;
displaying a logical address of the dropped terminal representation in the second area with the program element;
displaying a user-editable symbolic representation of the logical address together with the logical address; and
editing the user-editable symbolic representation of the logical address by clicking on the terminal representation corresponding to the hardware signal to be interconnected,
wherein the dropping of the representation of the selected terminal on the program element causes the hardware signal to be logically linked via the logical address with the program element without a user having to know the address convention used by the device.

6. The method according to claim 5, further comprises creating the schematic presentation using a plug-and-play function such that information required for the presentation is obtained from the connected device.

7. A computer program providing a graphical interconnection of a hardware signal of a controller device having a plurality of terminals, the program stored on a processor unit readable medium and having instructions that are executable on the processor unit, the processor unit coupled to the controller device, a keyboard, a mouse, and a display unit, the program when executed by the processor unit performs a method comprising:
providing a first area and a second area on the display unit;
displaying a schematic presentation of the device in the first area, each device terminal displayed in accordance with a position of the respective terminal on the device, each displayed device terminal including a logical address in accordance with an address convention of the device to assign a hardware signal to the logical address;
displaying a program element of a programming environment in the second area;
providing a symbolic address interface to a user of the program, the symbolic address interface allowing the user to perform edits on a symbolic representation of a logical address corresponding to a representation of one of the plurality of terminals displayed on the schematic presentation on the first area, the representation of said one of the plurality of terminals corresponding to a hardware signal to be interconnected, the symbolic address interface further allowing to display on the display unit the symbolic representation of the logical address together with the logical address, wherein the symbolic representation of the logical address is edited in response to a click on the representation of said one of the plurality of terminals corresponding to the hardware signal to be interconnected; and
providing a selection interface to the user, the selection interface allowing the user to:
select the representation of said one of the plurality of terminals,
drag the selected representation of said one of the plurality of terminals from the first area to the second area; and
drop the representation of said one of the plurality of terminals on the program element,
whereby the hardware signal is logically linked via the logical address with the program element without a user having to know the address convention used by the device.

8. The computer program according to claim 7, further comprises creating the schematic presentation using a plug-and-play function such that information required for the presentation is obtained from the coupled controller device.

* * * * *